March 3, 1959     D. S. JUSTICE     2,875,596
COMBINED SYSTEM FOR REFRIGERATION AND WATER PREHEATING
Filed Oct. 18, 1956     3 Sheets-Sheet 1

Donald S. Justice
INVENTOR

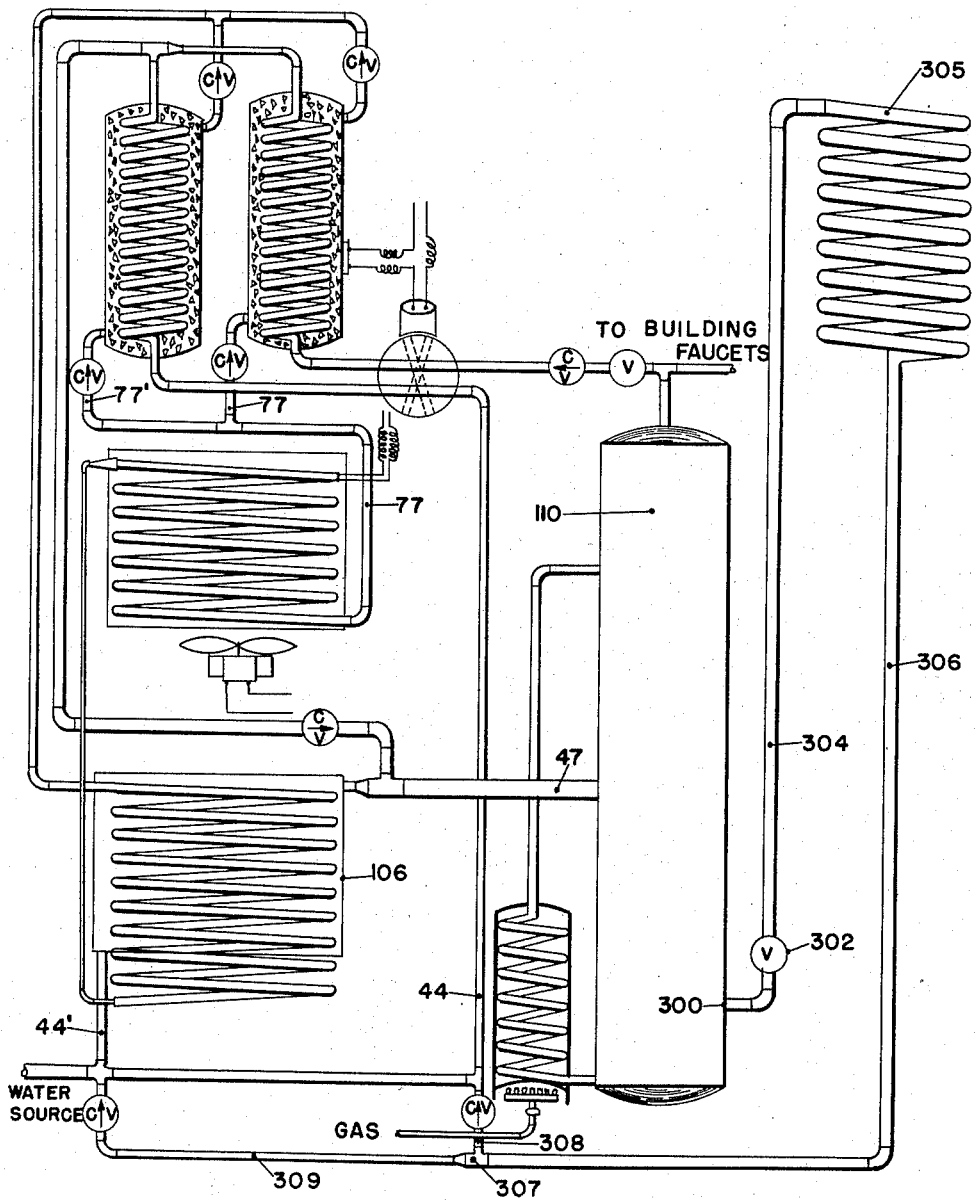
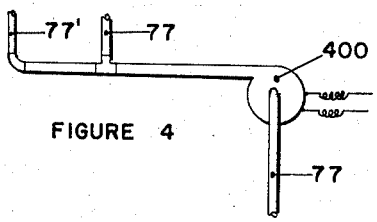
FIGURE 3
FIGURE 4
Donald S. Justice
INVENTOR

United States Patent Office 2,875,596
Patented Mar. 3, 1959

2,875,596

COMBINED SYSTEM FOR REFRIGERATION AND WATER PREHEATING

Donald S. Justice, Washington, D. C., assignor to The Justice Company, Washington, D. C., a corporation of Washington, D. C.

Application October 18, 1956, Serial No. 616,747

6 Claims. (Cl. 62—482)

This invention relates to a combination of components having essential unit representation as refrigeration and water heating in which unique features provide new efficiencies. The refrigeration portion may be employed to furnish a cold storage compartment, air conditioning cooling element, or the warming element of a heat pump arrangement. The illustrations assume the use of fuel, such as gas, for priming and auxiliary heat purposes, but it will be made quite obvious that electrical resistance, hot exhaust, friction, or other supply of heat will produce the same operation. In this embodiment assumption is made that hot water in good quantity and air conditioning are both desired in a structure such as a hospital, hotel, or home. An outstanding efficiency offered by this invention is the combination with such a hot water system whereby the water is at least preheated by the heat taken from the building or surrounding air in conditioning the air for the building. A heating of the water is had from the heat used to power the refrigeration cycle, and thus the cost of water heating for the building is reduced. At the same time evaporating cooling towers are eliminated and water tables conserved.

The ordinary cycle of refrigeration is used in which heat is absorbed in vaporizing a volatile liquid. Such vapor is condensed, liberating the heat, and the condensate is returned to the body of the liquid. In this invention a second condition of condensation and vaporization is interposed by an adsorptive system having the effect of a continuous aspirator in the refrigeration cycle. A dual unit adsorptive system is operated by heat in such manner that one unit is in the adsorption phase while the other unit is in the evaporation phase. The units alternate or reciprocate action by the shifting of heat from one to the other with the result of continuity in the aspiration effect, thus replacing the use of conventional mechanical compressors. All heat used, whether taken in the evaporator of the refrigeration cycle or whether supplied by hot water, is conserved in the hot water system of the building in which it is placed.

It is therefore an object of this invention to bring a silent refrigeration apparatus particularly adaptable in an air conditioner.

It is a further object of this invention to pre-heat water for a hot water system by flowing it in thermal exchange with the condenser element of an adsorptive type refrigeration system.

It is a further object of this invention to utilize the heat of adsorption in a refrigeration aspirator to pre-heat water for a hot water system.

It is a further object of this invention to prevent the overheating of water in the combination of a water heating system with an adsorptive type refrigeration system, during periods when hot water is not drained from the supply.

It is a further object of this invention to bring a refrigeration and hot water system combination in such efficient arrangement as to reduce the operation cost of both conveniences considered together.

It is a further object of this invention to eliminate wearing mechanical components, such as the conventional metal against metal friction type compressors, and to eliminate the need for other parts such as driers, filters, strainers, and evaporative towers from operation of the refrigeration cycle.

It is a further object of this invention to provide a heat pump system, by a modification of the basic elements, with provision for absorbing heat from the atmosphere to furnish warm air in a building.

Another object of this simplified system is to translate heat loss to heat gain so that it is balanced to the output of the apparatus as a whole.

Further objects and advantages will be apparent to persons skilled in the art as they follow a description of the disclosure and as illustrated in the accompanying drawings in which:

Figure 3 is an elevational view of an auxiliary water cooling adjunct showing the points of connection to the basic system.

Figure 4 is an elevational view of a modification.

Figure 1:
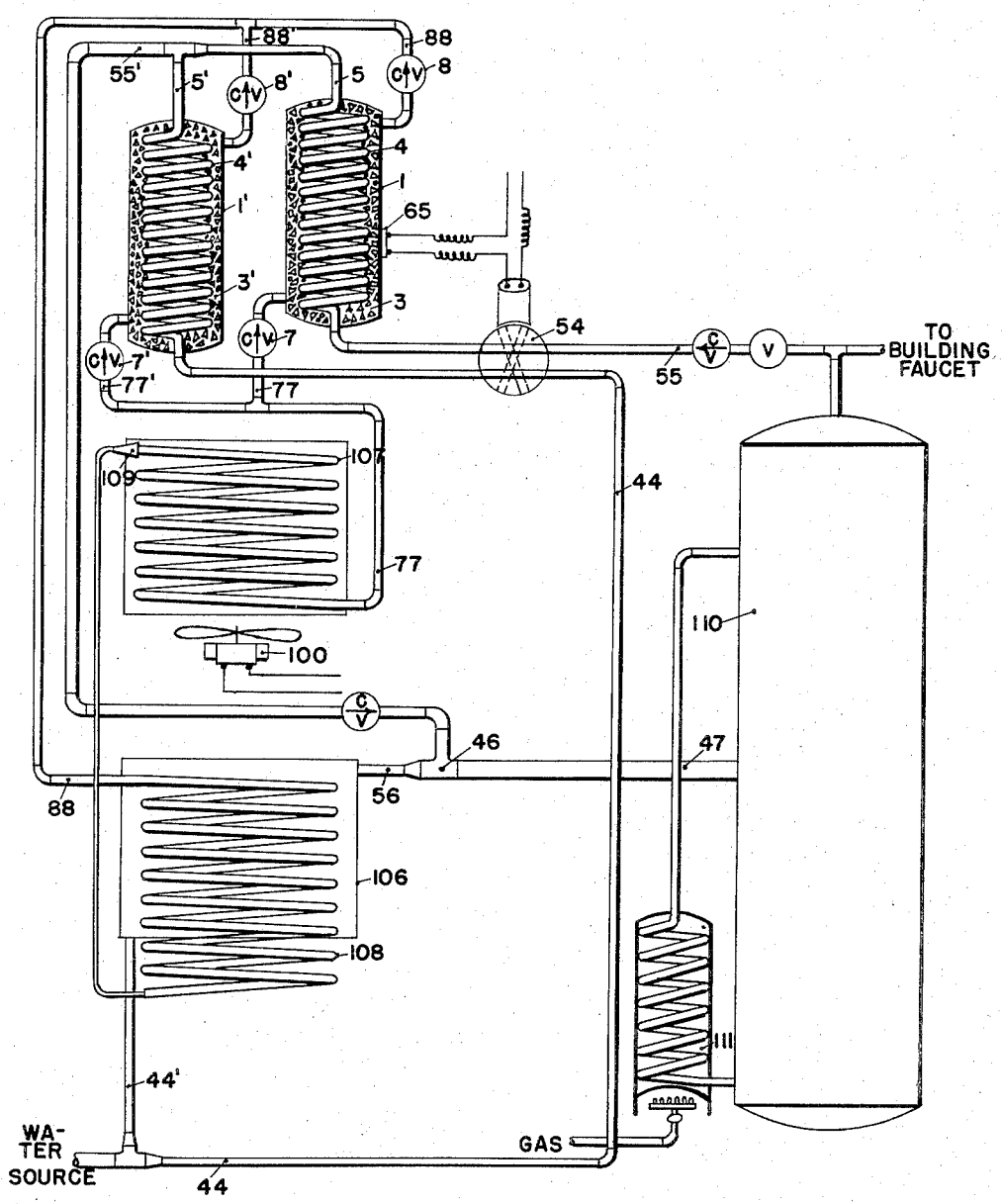
Figure 1 is a diagrammatic and schematic elevational view of the basic system.

Considering Figure 1, the refrigeration system has the conventional condenser 108 flowing its condensate of refrigerant under pressure through expansion valve 109 into the evaporator 107. Evaporator 107 may be provided with a blower or fan 100 for forcing air over its elements. Such air may be taken from any source and delivered as desired by ducts enclosing the evaporator. Between the evaporator and condenser is the dual unit adsorptive aspiration system shown in containers 1 and 1'. Refrigerant flow from the end of the evaporator 107 is through conduits 77 and 77' and check valves 7 and 7' into containers 1 and 1'. Containers 1 and 1' are filled with a suitable adsorbent material such as silica gel, activated charcoal, or copper particles shown at 3 and 3'. From containers 1 and 1' refrigerant flow is through check valves 8 and 8' and connectors 88 and 88' into condenser 108. Numbered components having corresponding prime numbers normally contemplate alternate use. As condensation is effected in condenser 108 the condensate drains downward by gravity to collect in the lower portion of the condenser or the receiver and then flow through expansion means under pressure. Expansion means is shown as an expansion valve at 109. The refrigerant with greatly increased evaporable surface enters the evaporator 107 from expansion valve 109 to absorb heat and leaves the evaporator in gaseous state under low pressure to be adsorbed in one or the other of containers 1 or 1'. The condensation phase of the adsorption process takes some time to cover the exposed surface in the mass of adsorptive substance 3 or 3'. While the gas is permeating such mass and condensing on the large surface area exposed, a great volume of gas is consumed by the reduction in forming condensate. This displacement is a constant influence to maintaining low pressure in evaporator 107 through connector 77. As will be shown later heat will be supplied alternately in containers 1 and 1' and absorbed by the mass of adsorptive substance 3 or 3' which, in turn, increases the volume of gas and causes a high pressure by super-heated vapor. The vapor under pressure has only one escape passageway 88 or 88' as the case may be. Escape is through one-way valve 8 or 8' to enter the condenser 108 under pressure and thus complete the cycle of refrigeration.

Further referring to Figure 1 with regard to the system of aspiration, it will be noted that containers 1 and 1' may be disposed at elevated positions. Numerals 4 and 4' designate water coils in containers 1 and 1'. These coils are supplied by hot and cold water alternately.

The hot and cold water arrangement contemplates an automatic alternate supply from the water intake source for the building, and from the heated water available for use in the structure as furnished by a conventional water heating system. In the illustrations for this disclosure an ordinary water tank 110 with flame type heater 111 alongside is shown without its thermostat or other automatic controls, although their use is contemplated. Hot water line 55 leads from the top of the storage tank, where temperature is highest, to join with water supply line 44 at two-position valve 54. Such two position juncture point 54 is represented here as a thermal valve responsive to temperature fluctuations in container 1 by a thermostat 65 positioned therein.

Continuing from valve 54 the water lines 55 and 44 connect with the lower ends of water coils 4 and 4' in containers 1 and 1' respectively. By this arrangement valve 54 is operable in two positions in which one position connects the cold water line 44 to coil 4 and the hot water line or pipe 55 to coil 4', and the other position connects the cold water pipe 44 to coil 4' and the hot water pipe 55 to coil 4. It will be seen then that each coil operates alternately as a heat source and as a heat absorber, and that the coils reciprocate such action so that when one is absorbing heat in its container the other is adding heat in its container. Thus the coils 4 and 4' are heat exchangers and they should be made of material having high heat conductivity. Reference is made to the greater dimension of pipe 55' as it continues from the outlet juncture of coils 4 and 4'. This pipe size increase is provided so as to cause flow by suction in either line 5 or 5' when the speed of flow in one of the lines is greater than the speed of flow in the other.

The space in containers 1 and 1' which is not taken by the coils 4 and 4' is filled with adsorptive substance such as activated charcoal, silica gel, activated alumna or other suitable material indicated in the drawings at 3 and 3'. The adsorbent substance acts to take up or adsorb large volumes of refrigerant vapor during the cooling phase. The fluctuation of temperature caused by the alternate flow of hot and cold water in the heat exchangers mentioned above contemplates changes of temperature within a container (1 or 1') and the adsorptive substance (3 or 3'), which changes cover the range between condensing and evaporating temperatures of well known refrigerants, and considers their commensurate condensing and evaporating pressures relative to the particular adsorptive substance selected. When heat is introduced to the body of adsorptive substance the adsorbed refrigerant on the surface of the substance begins to vaporize and increase the pressure in the container. As heat continues to accumulate the refrigerant expands to such pressure as to cause its escape through the outlet check valve of the container. After the heat phase the alternate heat absorbing phase of the heat exchanger begins and the remaining gas in the container contracts accordingly. In other words, the remaining gas adsorbs on the cooled surface of the adsorptive substance which causes a reduction in pressure in the container. The effect of gas passing out of the container with heat and the low pressure from contraction in the absence of heat is the same effect as aspiration in the system and thus the containers 1 and 1' constitute aspirators. It is apparent that one container instead of two will perform without a continuous high pressure to the condenser or continuous low pressure to the evaporator. Because of the time required in the change from a hot to a cooled condition in the adsorptive substance the use of copper particles may be advantageous as an aid to heat conduction.

Referring further to Figure 1, it is to be seen that water line 55' continues in greater dimension from water coils 4 and 4'. Pipe 55' joins pipe 47 at connector 46 between water jacket 106 and the water storage tank. Pipe 47 is also increased in dimension over the combined diameter of pipe 55' and the water jacket outlet pipe 56 for the purpose of increasing the flow in the pipe having lower flow. The source of water for the building hot water needs is divided in size on entry into the foregoing system. One half of the flow capacity is received by pipe 44 and the other half by pipe 44' which delivers into the lower part of jacket 106.

In the foregoing description of action within the containers 1 and 1' it is noted that heat loss in the hot water is compensated by heat gain in the cold water to be introduced into the hot water system. It is also noted that heat of adsorption is offset by the heat of vaporization in the evaporation phase. The heat loss in the system itself may be mitigated by the use of insulation. Some of the heat gain by expansion of the refrigerant in the evaporator may remain in the superheated gas outflowing from the aspirator or generator-absorber. This gas is under pressure and so passes into the condenser bearing heat of compression. The condenser is enclosed in a water jacket 106, at least in part, and such heat of compression passes through the condenser walls to be absorbed by the water. Moreover, the heat of vaporization is liberated by condensation and this heat also passes through the condenser walls. With this increased heat the water becomes less dense and is thus induced to flow into the mid portion of the hot water storage tank by natural circulation. The foregoing natural flow is in order when it is now observed that hot water may be used in quantity in the building and, in order to reach the hot water system, the building source of water must supply the required amount by passing through the aspirator and condenser jackets of the refrigerating system. Therefore the water entering the hot water system is at least preheated and the regular water heating means is automatically relegated to standby use for such time as its thermostat control may activate it. In other words the refrigeration system, incorporated in the building air conditioner for example, extracts heat from the building which is concentrated to heat the water in the hot water system for the building.

Figure 2:
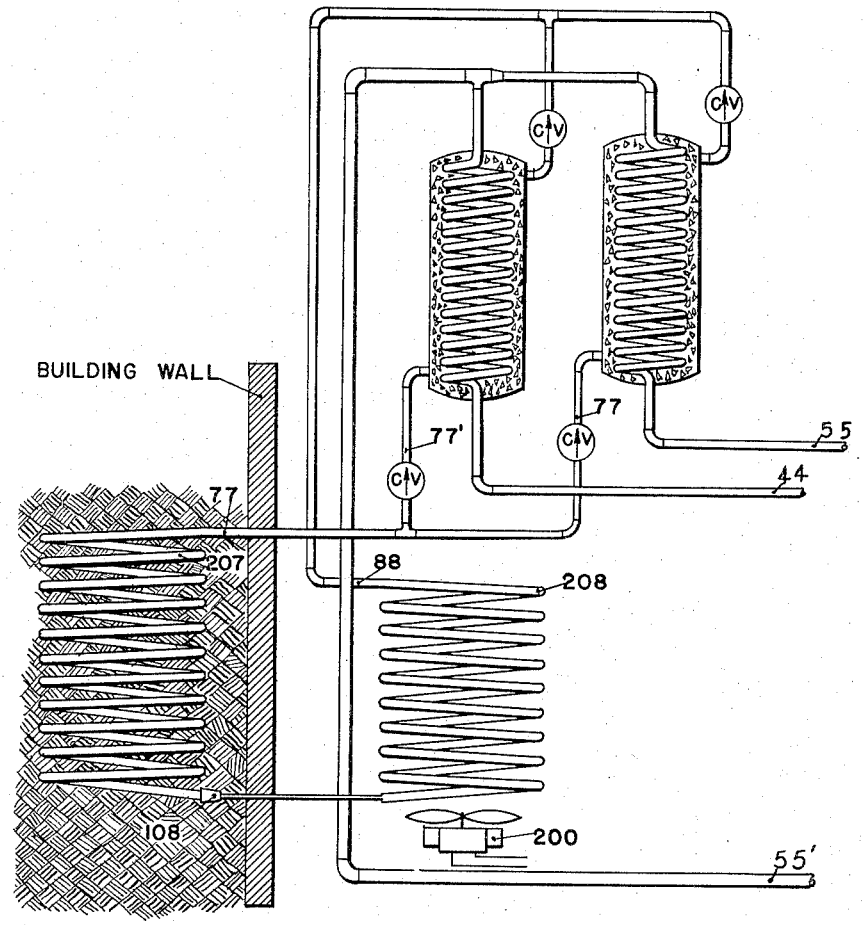
Figure 2 shows the same view of the invention including a heat pump arrangement for furnishing warm air instead of cold air.

Referring to Figure 2, the basic refrigeration system in the invention is retained to illustrate an arrangement of a heat pump. The heat pump may be utilized to furnish warm air from the refrigeration system condenser 208, and the fan 200 directs air over the condenser for this purpose. Such air may be supplied in the air duct system of the building and directed through conduits used for cold air when the system shown in Figure 1 is operating. Evaporator 207 is shown exterior of the building where it may absorb heat from ambient air. It is clear that evaporator 207 may be located within the building and a duct supplied to pass air into the building by a fan in the duct whereby such air is caused to flow over the heat absorbing elements of the evaporator and exhausted outside through a return duct. Any other suitable location of the evaporator will not depart from the invention herein disclosed. A location underground, wholly or in part, within or without the building may be more suited to a particular installation.

In the modification shown in Figure 2 the preheating of water to any high degree is foregone for the comfort of warm air in the building during a cool period. It may be expected that the regular water heater will have a higher fuel consumption because of its increased operation. It is apparent, however, that the overall cost of heating water and furnishing warm air for the building will be greatly reduced over combinations of conventional refrigeration compressors with hot water systems in a structure.

Continuing with the modification of Figure 2 it will be seen that condenser 208 is shown completely separated from the water system. This arrangement is used to show the availability of the condenser element of the refrigeration system to heat air as well as water. The condenser element of Figure 1 may be used to warm air, for example, by a by-pass of the water jacket in the water system, and removable side walls on the water jacket for the connection of air ducts. The purpose of this modification as shown, is to utilize the evaporator of the refrigerating system in its normal function of absorbing heat, at a low temperature, and concentrating such heat, by the normal function of the condensing element, for dissipation, resulting in a source of warmed air.

In the arrangement of Figure 1 or the modified system of Figure 2, it is contemplated that operating conditions may vary in any use or installation. During an overnight period, for example, the air conditioning may be desirable and yet no drain made on the store of hot water. In such instance the water at receiving temperature would not be replaced and all water in the system may become heated above the condensing temperature of a refrigerant in either the containers 1 and 1' or the refrigerant in the condenser element 108 in the water jacket 106, or both. To provide for such a contingency a water cooling system with automatic operation at the beginning of such circumstance is shown in Figure 3.

Figure 3 illustrates a water pipe 304 as a water outlet conduit from the supply tank 110 at point 300 positioned below the level of the water intake 47. Pipe 304 extends upward and is provided with a thermally operated valve 302 at point 300. Valve 302 is set to open at a predetermined temperature in accord with anticipated need. For example, the valve may be arranged to open when temperature of the water at the level of point 300 has risen to 160 degrees Fahrenheit. Pipe 304 is extended upward to the roof of the building, or to some other elevated place where it passes through a wall of the structure into the atmosphere. At this height pipe 304 turns downward into a configuration of great surface exposure such as coil 305 which constantly progresses downwardly. From coil pipe 305 pipe 304 returns to the water system as pipe 306. The capacity flow of pipe 306 is divided by suitable connector 307. Pipes 308 and 309 are approximately one-half the diameter of pipe 306 and join the water system with connector 307. Pipe 308 joins pipe 44 in advance of valve 54. Pipe 309 joins pipe 44' in advance of water jacket 106. The pipe system of this modification may be provided with stop-cocks for draining the line prior to freezing ambient temperatures.

It is now clear that the auxiliary pipe system of Figure 3 provides a means of cooling water sufficiently to permit continued operation of the refrigeration system during periods of inactivity of flow from the cold water source. In the example above, where the temperature of water at point 300 has risen to 160 degrees, valve 302 opens. The auxiliary pipe system is assumed to be filled and the temperature of the water therein is less than 160 degrees. The warmer water, being less dense, flows upward in pipe 304 to night time ambient temperature of say 75 degrees. Air flowing over coil 305 by convection absorbs heat from such exposed surface. Thus the heat of the water, at a higher temperature, passes through the pipe walls of coil 305 for dissipation, at the lower ambient temperature. Water so cooled in coil 305 becomes more dense and flows downward through pipe 306 to connector 307 at say 80 degrees temperature. Assume the refrigerant chosen for the refrigerator system to be monochlorodifluoromethane it will have a critical temperature of approximately 204 degrees Fahrenheit and respond readily to adsorption under the cooling influence of water at 80 degrees in coils 4 and 4' on adsorptive substances 3 and 3' in containers 1 and 1'. By the same provided condition water will enter jacket 106 at 80 degrees for a cooling influence to condenser 108. While the refrigerant in condenser 108 does not have the advantage of the process of adsorption at lower pressure and temperature, it does have the advantage of high pressure and the heat of compression available for dissipation, well under the aforesaid critical temperature. The foregoing assumption of standards will be recognized, by those skilled in the art, as being high and unnecessary for the assurance of practical operation under normal conditions. It will be seen then that the system eliminates the need for conventional evaporative cooling towers and provides a cooling means which operates without electricity for circulating power, and has no waste of water.

Figure 4 illustrates a hermetic motor blower 400 in conduit 77 which may be activated by pressure responsive switch positioned in evaporator 107. The use of fan or blower 400 is optional. Its puurpose is to furnish auxiliary means of speeding adsorption following a period of heating in container 1 or 1' by a slight increase in pressure. As a cooling period begins in one of the containers the first effect is the passing of heat from that part of the adsorptive substance immediately adjacent the cooling coil. Fan 400 will provide the presence of vapor so that condensation or adsorption can begin without delay. When the remainder heat in the container is absorbed by the water, only the heat of vaporization as it occurs from condensation will have to be absorbed by the water. This action is concurrent, however, and it suggests the use of heat absorbing or heat dissipating fins on the coils.

It is obvious to those skilled in the art that many modifications may be made, changes inserted, and additions imposed without departing from the spirit of the invention. It is desired to reserve such limitations allowed by prior art and as set forth in the appended claims.

I claim:

1. A combined water heating and refrigerating system comprising: a refrigerating unit having an evaporator and a condenser containing a refrigerant, a generator-absorber containing adsorptive substance connected in a line of refrigerant flow between the evaporator and condenser, a refrigerant flow connector between the condenser and evaporator having refrigerant expansion means adjacent the evaporator, a water coil positioned in the generator-absorber in thermal exchange with said adsorptive substance, means for supplying hot water or cold water through said water coil, means for flowing water from the water coil into a container for water, means for flowing cold water in heat exchange relation with said condenser and into said container for water, and means for adding heat to the water in the container, this heated water being the means for supplying hot water to said coil.

2. The system of claim 1 wherein said supply of hot water is stored in the upper portion of the container which has an outlet pipe extending upward from the lower portion, a return coil in the outlet pipe positioned beneath the highest point of said pipe extension and adapted to be in thermal exchange relation with the atmosphere, a downward extending pipe from the return coil connected to a conduit joining a cold water intake pipe for the system and also connected to a conduit joining with a water conduit for flow into heat exchange relation with the condenser.

3. The system of claim 1 wherein said evaporator is positioned in an exposure that is insulated from the rest of the system.

4. The system of claim 1 wherein an electrically operated hermetic motor blower is positioned in the line of refrigerant flow between the evaporator and generator-absorber for increasing the pressure in the generator-absorber, said motor being controlled by a pressure responsive switch in said evaporator.

5. The system of claim 1 wherein a conduit system is configurated to flow water through heat exchange relation with a cooling medium before entering heat exchange relation with said condenser.

6. A combined water heating and refrigerating system comprising: a refrigerating apparatus having an evaporator and a condenser containing a refrigerant, a system of two units separately connected in a line of refrigerant flow between the evaporator and condenser which system comprises a first container containing an adsorptive substance and a second container containing an adsorptive substance, a refrigerant flow connector between the condenser and evaporator having a refrigerant expansion device adjacent the evaporator, a water coil positioned in the first container and a water coil positioned in the second container each coil being in thermal communication with adsorptive substance, a two position solenoid valve having actuating means responsive to temperature changes in one of said containers, a hot water supply and a cold water supply separately connected for flow in either position through the solenoid valve, a conduit connecting one end of the coil in the first container to the solenoid valve for flow of cold water in one position and flow of hot water in the other position, a conduit connecting one end of the coil in the second container to the solenoid valve for flow of cold water in one position and flow of hot water in the other position, a conduit connecting each of the other ends of said coils with a conduit or greater dimension for flow of water into said hot water supply, and a water jacket containing said condenser having a water passageway from said cold water supply and an outlet for water flow into said conduit of greater dimension.

References Cited in the file of this patent
UNITED STATES PATENTS

| | | |
|---|---|---|
| 1,314,779 | Willsie | Sept. 2, 1919 |
| 1,786,861 | Miller et al. | Dec. 30, 1930 |
| 1,923,451 | Miller | Aug. 22, 1933 |
| 2,087,939 | Sarnmark | July 27, 1937 |